No. 854,823.
PATENTED MAY 28, 1907.
R. HEDRICH.
PROCESS OF MANUFACTURING ROOFING TILES.
APPLICATION FILED AUG. 20, 1906.
2 SHEETS—SHEET 1.
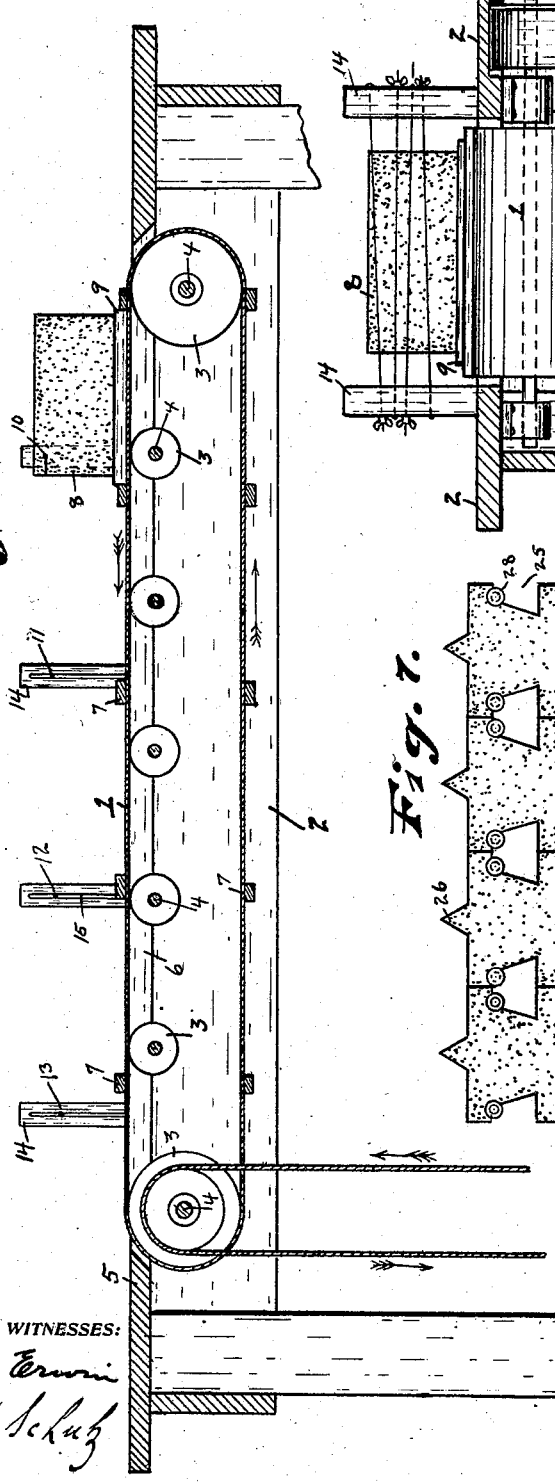
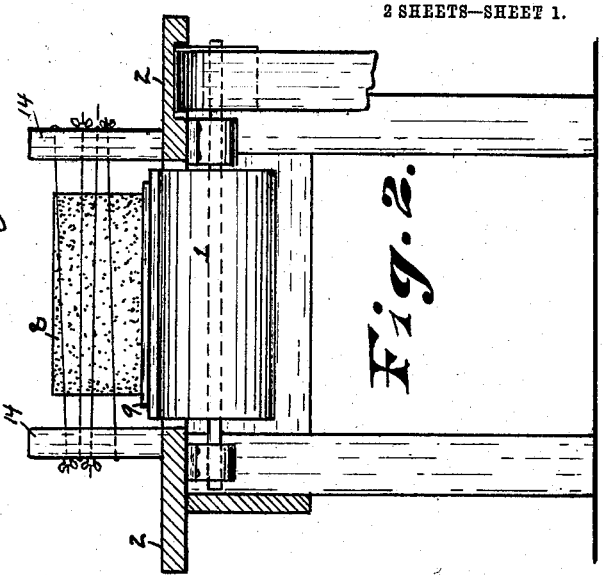
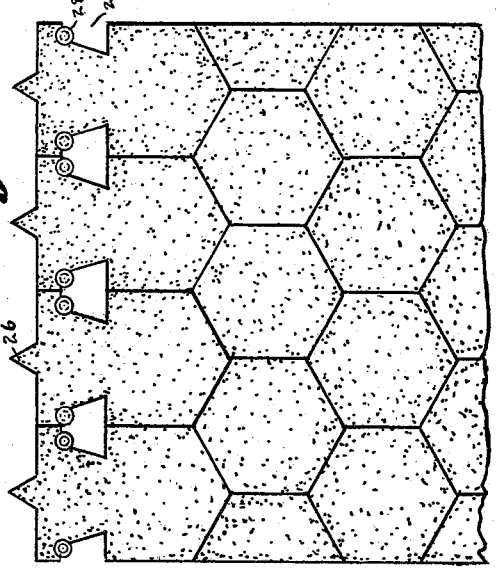
WITNESSES:
INVENTOR
Richard Hedrich
BY
ATTORNEYS No. 854,823. PATENTED MAY 28, 1907.
R. HEDRICH.
PROCESS OF MANUFACTURING ROOFING TILES.
APPLICATION FILED AUG. 20, 1906.
2 SHEETS—SHEET 2.
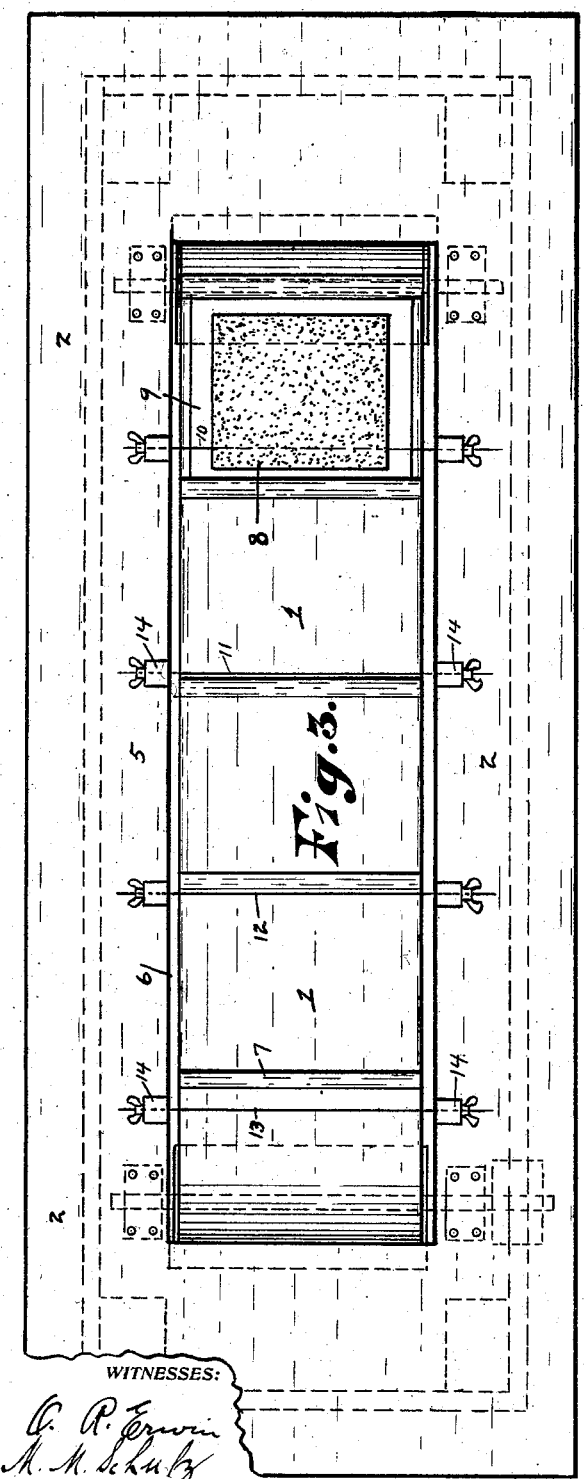
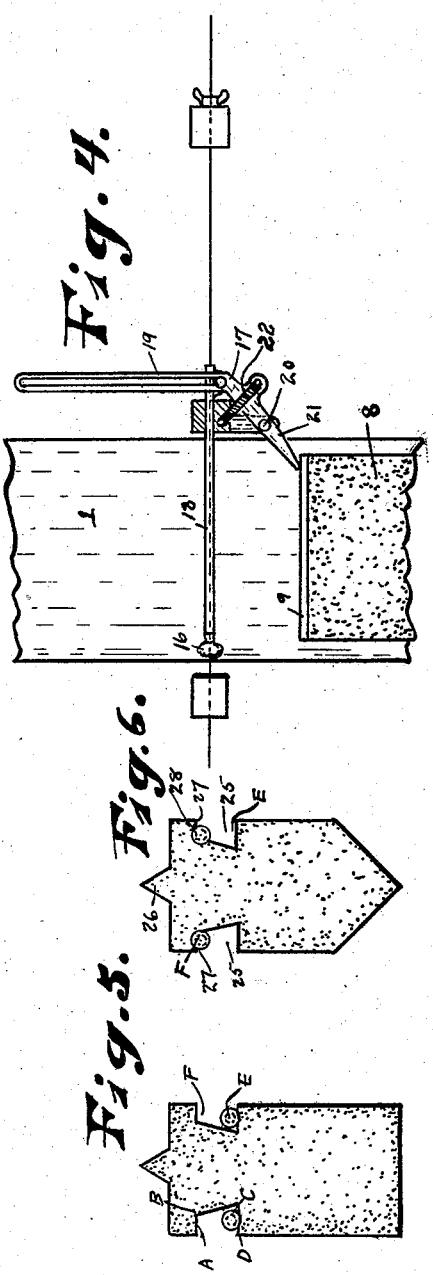
WITNESSES:
INVENTOR
Richard Hedrich
BY
Erwin & Wheeler
ATTORNEYS

UNITED STATES PATENT OFFICE.

RICHARD HEDRICH, OF MILWAUKEE, WISCONSIN, ASSIGNOR TO MARTHA HEDRICH, OF MILWAUKEE, WISCONSIN.

PROCESS OF MANUFACTURING ROOFING-TILES.

No. 854,823.            Specification of Letters Patent.            Patented May 28, 1907.

Application filed August 20, 1906. Serial No. 331,252.

*To all whom it may concern:*

Be it known that I, RICHARD HEDRICH, a citizen of the United States, residing at Milwaukee, in the county of Milwaukee and State of Wisconsin, have invented new and useful Improvements in Processes of Manufacturing Roofing-Tiles, of which the following is a specification.

My invention relates to improvements in processes of manufacturing roofing tiles and it pertains among other things more especially, first, to the process of cutting a plurality of tiles of the desired shape and thickness from a block of soft clay and permitting such tile to remain in contact while being cut, handled and burned, whereby said tiles or the several pieces of clay from which they are formed may not only be handled together but the work more quickly and easily done and also by which the several pieces thus cut mutually strengthen and support each other and are less liable to become warped before they are burned or broken in handling after they are burned.

My process is further explained by reference to the accompanying drawings in which, Figure 1 is a longitudinal, vertical section of a machine upon which the blocks of clay are cut preparatory to being burned. Fig. 2 is a transverse section. Fig. 3 is a plan view. Fig. 4 is a detail showing a device for automatically cleaning the cutting wires preparatory to entering the blocks of clay. Fig. 5 is a top view of one of the blocks of clay as it is formed preparatory to being severed by the wires. Fig. 6 is a top view of the modified form of one of the blocks in which the corners of the exposed ends are removed, whereby the roof formed with the tiles will be given a neater and more finished appearance, and Fig. 7 is a portion of the roof which is covered by my improved form of tiles showing the shape of the exposed ends.

Like parts are identified by the same reference characters throughout the several views.

The machine upon which the blocks of clay are cut comprises among other things an endless belt 1 which is revolubly supported from the table 2 upon the transverse rollers 3, which rollers 3 are in turn supported on the shafts 4.

5 is a table top which is provided with a plurality of transverse slots 6 for the reception of the rollers 3 and the rollers are so located that the periphery extends slightly above the upper surface of the table top whereby the belt 1 will be carried forward by the revolving movement of the rollers 3.

The belt 1 is provided at short intervals with a plurality of transverse cleats 7 which serve to prevent the blocks of clay 8 carried by the belt from being moved rearwardly as they are being cut. The block of clay 8 is supported upon the board 9 by which board it is carried and placed upon the belt. Several blocks of clay may if desired be located upon the upper surface of the endless belt at the same time and they are respectively cut or sliced as they move forward by the transversely arranged cutting wires 10, 11, 12 and 13. Said wires are supported from the table by the vertical posts 14 and the several transverse wires are connected with said supporting posts successively lower from the first to the last as indicated in Fig. 1, whereby as the block of clay 8 is moved from right toward the left it will be first brought in contact with the upper wire 10 when a slice of clay will be cut from the upper side of the block. As the block passes from beneath the wire 10 it is brought in contact with the wire 11, whereby the second slice will be cut from the block and so on and said wires 11, 12 and 13 act successively upon the block of clay until the same has been cut into the desired number of pieces. It will be obvious that by this arrangement the block will receive but a single cut at a time and that the second wire does not begin to act upon the block of clay until the first has passed through it whereby the power required to operate the machine is much less than it would otherwise be were several cuts made simultaneously.

It will be understood of course that the blocks of clay or other substances may be cut straight or at any desired angle according to the adjustment of the wires upon the supporting posts 14. Said posts are provided with vertical slots 15 for the ends of the respective wires which slots permit the desired adjustment referred to.

It will be understood that if preferred roofing tiles may be made with the protruding ends thicker than their covered ends, so that they will taper slightly from one end to the other. It follows that when desirous to cut the clay for wedge-shaped or tapered tiles, each alternate wire is inclined in the opposite direction from the other as shown in Fig. 2, whereby the thick end will be cut from one side of the block and the thin end of the other, whereby the entire block may be cut into wedge-shaped tiles without any waste of material.

Experience has shown that to produce the best results the wires will make a cleaner and finer cut if they are wiped clean and moistened or oiled after each cut preparatory to entering the next succeeding block. To accomplish this object I provide each of the cutting wires with a device for wiping off the same which device comprises a sponge or brush 16 (which is supported from the cutting wires), two-arm lever 17, link 18 (communicating between the long arm 19 of said two-arm lever and the sponge or brush 16), lever supporting pivot 20 and contact arm 21. The lever 17 is so located that the short contact arm 21 is brought in line with the line of movement of the board 9, whereby as the board is brought in contact with said short arm 21 the brush or sponge 16 will be drawn longitudinally across the wire from right to left whereby the same is cleaned. When the board 9 is moved forward past the arm 21, said arm and brush 16 will be brought back to the position shown in Fig. 4 by the recoil of the spiral spring 22 which spring 22 is connected at one end with the long arm 19 and at the other end to the post 14. Thus it is obvious that the respective brushes or sponges will be drawn across the wire and the wire cleaned preparatory to entering the blocks of clay and that as soon as said wires have passed through the blocks of clay, said brush will be thrown back to its normal position shown in Fig. 4 by the recoil of said spiral springs.

For the purpose of oiling or wetting the cutting wires the sponge or brush 16 may be saturated with oil or water in any convenient manner.

Experience has shown that the pieces of clay as they are successively severed by the wires will fall back upon each other and remain in contact and the blocks maintain the same general shape and contour as before they were severed, whereby all the several pieces comprising the block thus severed may be simultaneously handled and set up in a drying and burning kiln the same as bricks are ordinarily laid up preparatory to drying and burning, whereby said blocks are not only more quickly and easily handled but they are also less liable to warp or bend before they are burned and less liable to break after they are burned, and the labor of handling such parts is thereby diminished.

When the blocks have been dried and burned the tiles are readily separated from each other by inserting a knife or wedge shaped instrument between them when they are ready for use. Preparatory to placing the blocks upon the machine by which they are severed or cut into the several pieces they are preferably formed with two vertical side channels 25 for the reception of the fastening nails 28 and with a V-shaped projection 26 which facilitates handling the blocks. The vertical channels or V-shaped projections having been formed in the blocks and the blocks having been formed into tiles and burned they are secured in courses upon the roof by nails which engage the shoulders 27, 27, of the tiles. The channels 25 are preferably formed along the following lines: horizontal line A, B formed at right angles to the edges of the tile, diagonal line B, C converging inwardly and downwardly from the edge of the tile toward its center, and angular lines C, D diverging outwardly to the edge of the tile, whereby when a nail is entered at the lower side of said channel as indicated at E in Fig. 5 it will when tiles are in place upon a roof, be caused to impinge against the tiles at the upper edge of said channel at F, it being understood that when the nails 28 are driven into the roof, a gage or templet is preferably employed for the purpose of setting them in the proper relative position to each other corresponding with the width of the tiles. When the tiles are being thus placed upon the nails the heads of the nails pass through the lower and wider side of said channels, the tiles are then moved down to their proper position on the roof, when, owing to the diverging side of said channel they are caused to impinge against said nails and thereby permanently secure in place.

It will be understood that in case the several pieces of tiles do not as they are being cut cohere together sufficiently to retain such pieces in their proper relative position to each other such pieces may be more rigidly connected together by compressing the V-shaped projections 26 slightly, whereby such projections are caused to cohere with sufficient rigidity to retain the several pieces in their proper relative position during the process of handling, drying and firing the same.

Having thus described my invention what I claim as new and desire to secure by Letters Patent, is,

1. The process herein described of manufacturing roofing tiles consisting first, in forming plastic clay into blocks, the vertical sides and ends of which conform in shape to the desired shape of the sides and ends of the tiles when made; second, severing such blocks transversely to the vertical sides and ends into a plurality of thin pieces by a plurality of cuts and permitting the pieces thus formed to fall back upon each other leaving the general contour of the severed blocks unchanged; third, removing the several pieces thus formed with their relative position undisturbed and drying and firing the same in a suitable kiln together; and fourth, separating the several pieces thus formed from each other.

2. The process herein described of manufacturing roofing tiles consisting first, in forming plastic clay into blocks; second, in forming vertical nail receiving channels in the respective vertical sides of said blocks; third, severing said blocks transversely to their vertical sides into a plurality of thin pieces by a plurality of cuts and permitting the several pieces to fall back upon each other and temporarily cohere together leaving the general contour of the severed blocks unchanged; fourth, removing the severed pieces thus formed with their relative position undisturbed and drying and firing the same in a suitable kiln together; and fifth, separating the severed pieces thus formed from each other.

3. The process herein described of manufacturing roofing tiles consisting first, of forming plastic clay into blocks; second, in forming vertical nail receiving channels in the respective vertical sides of said blocks; third, severing said blocks transversely to their vertical sides into a plurality of thin pieces, successively, by a plurality of separate cuts and permitting the severed pieces to fall back upon each other and temporarily cohere together, leaving the general contour of the severed blocks unchanged; fourth, removing the severed pieces thus formed with their relative position undisturbed and drying and firing the same in a suitable kiln together; and fifth separating the severed pieces thus formed from each other.

4. The process herein described of manufacturing roofing tiles consisting, first, in forming plastic clay into blocks; second, in forming vertical V-shaped projections at one end of said blocks; third, severing said blocks transversely to their vertical sides into a plurality of thin pieces by a plurality of cuts and permitting the severed pieces to fall back upon each other; fourth, pressing said V-shaped projections against each other so that they will temporarily cohere together during the process of handling, drying and firing the same in a suitable kiln; and sixth, separating the several pieces thus formed from each other.

In testimony whereof I affix my signature in the presence of two witnesses.

RICHARD HEDRICH. 

Witnesses:
   Jas. B. Erwin,
   M. M. Schulz.